(12) United States Patent
Levy-Rosenthal

(10) Patent No.: US 10,424,318 B2
(45) Date of Patent: Sep. 24, 2019

(54) METHOD, SYSTEM AND PROGRAM PRODUCT FOR PERCEIVING AND COMPUTING EMOTIONS

(71) Applicant: Patrick Levy-Rosenthal, New York, NY (US)

(72) Inventor: Patrick Levy-Rosenthal, New York, NY (US)

(*) Notice: Subject to any disclaimer, the term of this patent is extended or adjusted under 35 U.S.C. 154(b) by 603 days.

(21) Appl. No.: 14/254,276

(22) Filed: Apr. 16, 2014

(65) Prior Publication Data

US 2015/0012463 A1    Jan. 8, 2015

Related U.S. Application Data

(60) Provisional application No. 61/812,260, filed on Jul. 5, 2013.

(51) Int. Cl.
*G06N 5/04* (2006.01)
*G10L 25/63* (2013.01)
*G10L 25/90* (2013.01)

(52) U.S. Cl.
CPC .............. *G10L 25/63* (2013.01); *G06N 5/04* (2013.01); *G10L 25/90* (2013.01)

(58) Field of Classification Search
None
See application file for complete search history.

(56) References Cited

U.S. PATENT DOCUMENTS 8,996,429 B1    3/2015   Francis, Jr. et al.
2006/0167694 A1  7/2006  Mitsuyoshi

OTHER PUBLICATIONS

Rabie, Audio-Visual Emotion Recognition for Natural Human-Robot Interaction, Doctoral Thesis, University of Bielefeld, 2010, pp. 1-118 (Year: 2010).*
Breazeal (Ferrell), Cynthia, "Early Experiments using Motivations to Regulate Human-Robot Interaction," AAAI Fall Symposium on Emotional and Intelligent: The tangled knot of cognition, Technical Report FS-98-03, Mar. 1998 (6 pages).
"Emotion Engine," archived Wikipedia article, last edited Apr. 28, 2013, retrieved from <https://web.archive.org/web/20130604031726/ https://en.wikipedia.org/wiki/Emotion_Engine> (5 pages).

* cited by examiner

*Primary Examiner* — Wilbert L Starks
(74) *Attorney, Agent, or Firm* — McCarter & English, LLP

(57) ABSTRACT

A method, system and program product comprise monitoring inputs, into a system, for detected actions from a user. At least one detected action is identified. At least a first database storage location associated with the user is accessed. The first database storage location is at least configured for storage of emotional profiles of the user. At least a second storage location associated with the system is accessed. The second storage location is at least configured for storage of emotional profiles of the system. The at least one detected action is processed in a computational machine using data from the first storage location to determine a status of the user. A response to the status of the user is calculated. The response is at least in part determined by the status of the user and data contained in the second storage location.

24 Claims, 10 Drawing Sheets

METHOD, SYSTEM AND PROGRAM PRODUCT FOR PERCEIVING AND COMPUTING EMOTIONS

CROSS-REFERENCE TO RELATED APPLICATIONS

The present Utility patent application claims priority benefit under 35 U.S.C. 119(e) of the U.S. provisional application for patent Ser. No. 61/812,260, entitled "A SYSTEM AND METHOD FOR PERCEIVING AND COMPUTING EMOTIONS", and having a filing date of 5 Jul. 2013. The contents of this related provisional application are incorporated herein by reference for all purposes to the extent that such subject matter is not inconsistent herewith or limiting hereof.

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office, patent file or records, but otherwise reserves all copyright rights whatsoever.

FIELD OF THE INVENTION

One or more embodiments of the invention generally relate to artificial intelligence. More particularly, the invention relates to discerning and/or responding to emotion using artificial intelligence.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

One key aspect in creating effective and useful artificial intelligence may be an ability to convert a general computational machine into an integrated system with human emotional capabilities. Currently, such emotions may often be conveyed by a system in a largely static manner in which a device, robot, or avatar may react to a program which may provide commands for built-in mimics of emotions. These systems may not effectively provide a system and/or method that may be capable of perceiving and computing emotions in machines and/or users. A solution which did so would be desirable.

In view of the foregoing, it is clear that these traditional techniques are not perfect and leave room for more optimal approaches.

BRIEF DESCRIPTION OF THE DRAWINGS

The present invention is illustrated by way of example, and not by way of limitation, in the figures of the accompanying drawings and in which like reference numerals refer to similar elements and in which.

Figure 1:
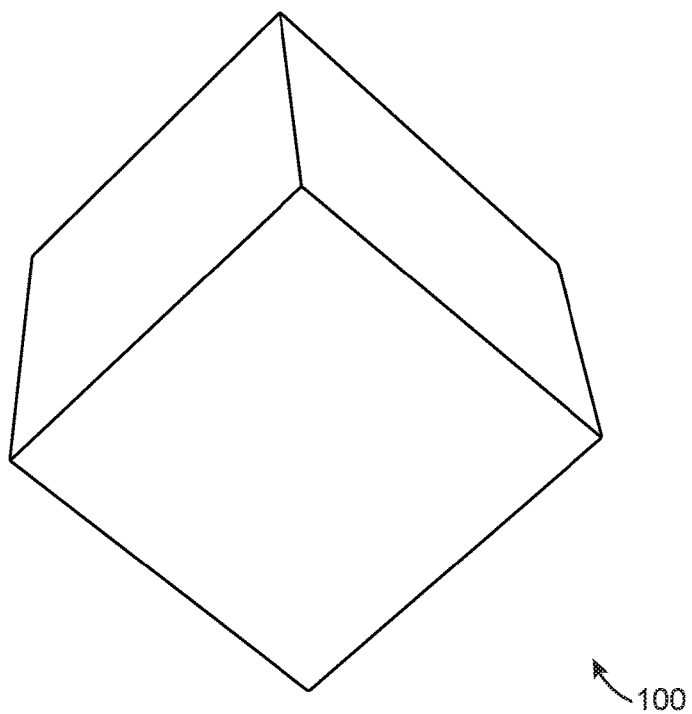
FIG. 1 is an illustration of an exemplary device for running embodiment software, in accordance with an embodiment of the present invention.

Unless otherwise indicated illustrations in the figures are not necessarily drawn to scale.

DETAILED DESCRIPTION OF SOME EMBODIMENTS

The present invention is best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are numerous modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures. The present invention will now be described in detail with reference to embodiments thereof as illustrated in the accompanying drawings.

From reading the present disclosure, other variations and modifications will be apparent to persons skilled in the art. Such variations and modifications may involve equivalent and other features which are already known in the art, and which may be used instead of or in addition to features already described herein.

Although Claims have been formulated in this application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any Claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The Applicants hereby give notice that new Claims may be formulated to such features and/or combinations of such features during the prosecution of the present application or of any further application derived therefrom.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

Headings provided herein are for convenience and are not to be taken as limiting the disclosure in any way.

The enumerated listing of items does not imply that any or all of the items are mutually exclusive, unless expressly specified otherwise.

The terms "a", "an" and "the" mean "one or more", unless expressly specified otherwise.

Devices or system modules that are in at least general communication with each other need not be in continuous communication with each other, unless expressly specified otherwise. In addition, devices or system modules that are in at least general communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

As is well known to those skilled in the art many careful considerations and compromises typically must be made when designing for the optimal manufacture of a commercial implementation any system, and in particular, the embodiments of the present invention. A commercial implementation in accordance with the spirit and teachings of the present invention may configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

A "computer" may refer to one or more apparatus and/or one or more systems that are capable of accepting a structured input, processing the structured input according to prescribed rules, and producing results of the processing as output. Examples of a computer may include: a computer; a stationary and/or portable computer; a computer having a single processor, multiple processors, or multi-core processors, which may operate in parallel and/or not in parallel; a general purpose computer; a supercomputer; a mainframe; a super mini-computer; a mini-computer; a workstation; a micro-computer; a server; a client; an interactive television; a web appliance; a telecommunications device with internet access; a hybrid combination of a computer and an interactive television; a portable computer; a tablet personal computer (PC); a personal digital assistant (PDA); a portable telephone; application-specific hardware to emulate a computer and/or software, such as, for example, a digital signal processor (DSP), a field-programmable gate array (FPGA), an application specific integrated circuit (ASIC), an application specific instruction-set processor (ASIP), a chip, chips, a system on a chip, or a chip set; a data acquisition device; an optical computer; a quantum computer; a biological computer; and generally, an apparatus that may accept data, process data according to one or more stored software programs, generate results, and typically include input, output, storage, arithmetic, logic, and control units.

Those of skill in the art will appreciate that where appropriate, some embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Where appropriate, embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

"Software" may refer to prescribed rules to operate a computer. Examples of software may include: code segments in one or more computer-readable languages; graphical and or/textual instructions; applets; pre-compiled code; interpreted code; compiled code; and computer programs.

The example embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software program code for carrying out operations for aspects of the present invention can be written in any combination of one or more suitable programming languages, including an object oriented programming languages and/or conventional procedural programming languages, and/or programming languages such as, for example, Hyper text Markup Language (HTML), Dynamic HTML, Extensible Markup Language (XML), Extensible Stylesheet Language (XSL), Document Style Semantics and Specification Language (DSSSL), Cascading Style Sheets (CSS), Synchronized Multimedia Integration Language (SMIL), Wireless Markup Language (WML), Java™, Jini™, C, C++, Smalltalk, Perl, UNIX Shell, Visual Basic or Visual Basic Script, Virtual Reality Markup Language (VRML), ColdFusion™ or other compilers, assemblers, interpreters or other computer languages or platforms.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

A network is a collection of links and nodes (e.g., multiple computers and/or other devices connected together) arranged so that information may be passed from one part of the network to another over multiple links and through various nodes. Examples of networks include the Internet, the public switched telephone network, the global Telex network, computer networks (e.g., an intranet, an extranet, a local-area network, or a wide-area network), wired networks, and wireless networks.

The Internet is a worldwide network of computers and computer networks arranged to allow the easy and robust exchange of information between computer users. Hundreds of millions of people around the world have access to computers connected to the Internet via Internet Service Providers (ISPs). Content providers (e.g., website owners or operators) place multimedia information (e.g., text, graphics, audio, video, animation, and other forms of data) at specific locations on the Internet referred to as webpages. Websites comprise a collection of connected, or otherwise related, webpages. The combination of all the websites and their corresponding webpages on the Internet is generally known as the World Wide Web (WWW) or simply the Web.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

It will be readily apparent that the various methods and algorithms described herein may be implemented by, e.g., appropriately programmed general purpose computers and computing devices. Typically a processor (e.g., a microprocessor) will receive instructions from a memory or like device, and execute those instructions, thereby performing a process defined by those instructions. Further, programs that implement such methods and algorithms may be stored and transmitted using a variety of known media.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

The functionality and/or the features of a device may be alternatively embodied by one or more other devices which are not explicitly described as having such functionality/features. Thus, other embodiments of the present invention need not include the device itself.

The term "computer-readable medium" as used herein refers to any medium that participates in providing data (e.g., instructions) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols, such as Bluetooth, TDMA, CDMA, 3G.

Where databases are described, it will be understood by one of ordinary skill in the art that (i) alternative database structures to those described may be readily employed, (ii) other memory structures besides databases may be readily employed. Any schematic illustrations and accompanying descriptions of any sample databases presented herein are exemplary arrangements for stored representations of information. Any number of other arrangements may be employed besides those suggested by the tables shown. Similarly, any illustrated entries of the databases represent exemplary information only; those skilled in the art will understand that the number and content of the entries can be different from those illustrated herein. Further, despite any depiction of the databases as tables, an object-based model could be used to store and manipulate the data types of the present invention and likewise, object methods or behaviors can be used to implement the processes of the present invention.

A "computer system" may refer to a system having one or more computers, where each computer may include a computer-readable medium embodying software to operate the computer or one or more of its components. Examples of a computer system may include: a distributed computer system for processing information via computer systems linked by a network; two or more computer systems connected together via a network for transmitting and/or receiving information between the computer systems; a computer system including two or more processors within a single computer; and one or more apparatuses and/or one or more systems that may accept data, may process data in accordance with one or more stored software programs, may generate results, and typically may include input, output, storage, arithmetic, logic, and control units.

A "network" may refer to a number of computers and associated devices that may be connected by communication facilities. A network may involve permanent connections such as cables or temporary connections such as those made through telephone or other communication links. A network may further include hard-wired connections (e.g., coaxial cable, twisted pair, optical fiber, waveguides, etc.) and/or wireless connections (e.g., radio frequency waveforms, free-space optical waveforms, acoustic waveforms, etc.). Examples of a network may include: an internet, such as the Internet; an intranet; a local area network (LAN); a wide area network (WAN); and a combination of networks, such as an internet and an intranet.

As used herein, the "client-side" application should be broadly construed to refer to an application, a page associated with that application, or some other resource or function invoked by a client-side request to the application. A "browser" as used herein is not intended to refer to any specific browser (e.g., Internet Explorer, Safari, FireFox, or the like), but should be broadly construed to refer to any client-side rendering engine that can access and display Internet-accessible resources. A "rich" client typically refers to a non-HTTP based client-side application, such as an SSH or CFIS client. Further, while typically the client-server interactions occur using HTTP, this is not a limitation either. The client server interaction may be formatted to conform to the Simple Object Access Protocol (SOAP) and travel over HTTP (over the public Internet), FTP, or any other reliable transport mechanism (such as IBM® MQSeries® technologies and CORBA, for transport over an enterprise intranet) may be used. Any application or functionality described herein may be implemented as native code, by providing hooks into another application, by facilitating use of the mechanism as a plug-in, by linking to the mechanism, and the like.

Exemplary networks may operate with any of a number of protocols, such as Internet protocol (IP), asynchronous transfer mode (ATM), and/or synchronous optical network (SONET), user datagram protocol (UDP), IEEE 802.x, etc.

Embodiments of the present invention may include apparatuses for performing the operations disclosed herein. An apparatus may be specially constructed for the desired purposes, or it may comprise a general-purpose device selectively activated or reconfigured by a program stored in the device.

Embodiments of the invention may also be implemented in one or a combination of hardware, firmware, and software. They may be implemented as instructions stored on a machine-readable medium, which may be read and executed by a computing platform to perform the operations described herein.

More specifically, as will be appreciated by one skilled in the art, aspects of the present invention may be embodied as a system, method or computer program product. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

In the following description and claims, the terms "computer program medium" and "computer readable medium" may be used to generally refer to media such as, but not limited to, removable storage drives, a hard disk installed in hard disk drive, and the like. These computer program products may provide software to a computer system. Embodiments of the invention may be directed to such computer program products.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, and as may be apparent from the following description and claims, it should be appreciated that throughout the specification descriptions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory. A "computing platform" may comprise one or more processors.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

While a non-transitory computer readable medium includes, but is not limited to, a hard drive, compact disc, flash memory, volatile memory, random access memory, magnetic memory, optical memory, semiconductor based memory, phase change memory, optical memory, periodically refreshed memory, and the like; the non-transitory computer readable medium, however, does not include a pure transitory signal per se; i.e., where the medium itself is transitory.

Some embodiments of the present invention may provide means and/or methods for improved computational response to user input. Some of these embodiments may comprise computer software. In some of these embodiments, software may be integrated into hardware, including, without limitation, uniquely-designed hardware for running embodiment software.

FIG. 1 is an illustration of an exemplary device for running embodiment software, in accordance with an embodiment of the present invention. In the present embodiment, device may have a shape of a cube 100. In the following description, "cube" may be used to refer to a device suitable for running embodiment software. However, usage of "cube" does not limit device to any particular shape. In many embodiments, such devices may be any shape, including, without limitation, cube, disc, sphere, rectangular parallelepiped, free-form shape, etc.

Figure 2:
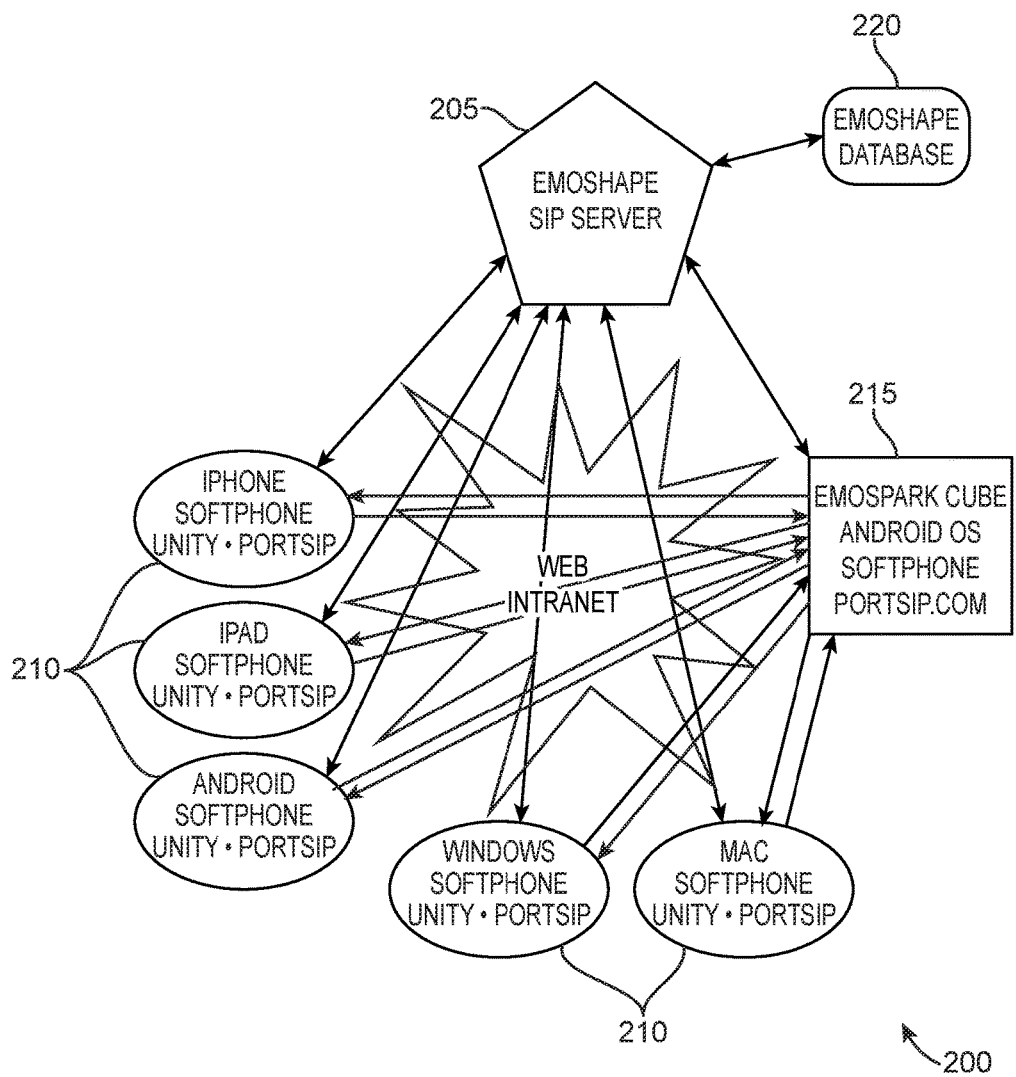
FIG. 2 is an illustration of an exemplary system for providing improved computational response to user input, in accordance with an embodiment of the present invention.

FIG. 2 is an illustration of an exemplary system for providing improved computational response to user input, in accordance with an embodiment of the present invention. In the present embodiment, a server 205 may facilitate communication between various electronic devices 210 and cube 215. In some embodiments, devices 210 may utilize a variety of software development kit (SDK), existing protocols and libraries, including, without limitation, Unity 3D, PORTSIP, opencv, and OpenEAR. In the present embodiment, server 205 may communicate bi-directionally with a database 220 to provide ability for improved information storage.

In some embodiments, cube 100 may have memory suitable for storing user input and/or data from other devices. In some of these embodiments, cube 100 may also have means for processing stored and/or received data. In a non-limiting example, cube 100 may have an emotion processing unit (EPU) which may be loaded with emotional profile graphs (EPG). In some embodiments, cube 100 may communicate with server 205 to transmit and/or receive data in response to various stimuli, including, without limitation, environmental conditions, internal actions, external computational machines, and/or user input. In a non-limiting example, cube 100 may receive information regarding user's emotional state such as, but not limited to, extracted from the face tracking analysis, the harmonics and pitch, the words in the conversation, and transmit an appropriate response as determined by reference to memory and/or processing unit. In some embodiments, cube 100 may be integrated with various computational machines, including, without limitation, robots and/or gaming avatars. In some of these embodiments, cube 100 may transmit data to computational machine to control behavior of computational machine. In a non-limiting example, a cube 100 may determine a user's emotional state at a given point in time. In the present non-limiting example, cube 100 may transmit data regarding user's emotional state to an external device showing an avatar, and the avatar may then perform an action representative of user's emotional state. In some embodiments, cube 100 may compare received data to stored data. In a non-limiting example, a cube 100 may compare received information regarding a user's emotional state to stored data of user's past emotional states. In some embodiments, cube 100 may transmit results of comparison to a server 205 for further processing of comparison data. In some of these embodiments, server 205 may then transmit processed data to external computational machine to produce a representation of processed data.

Figure 3:
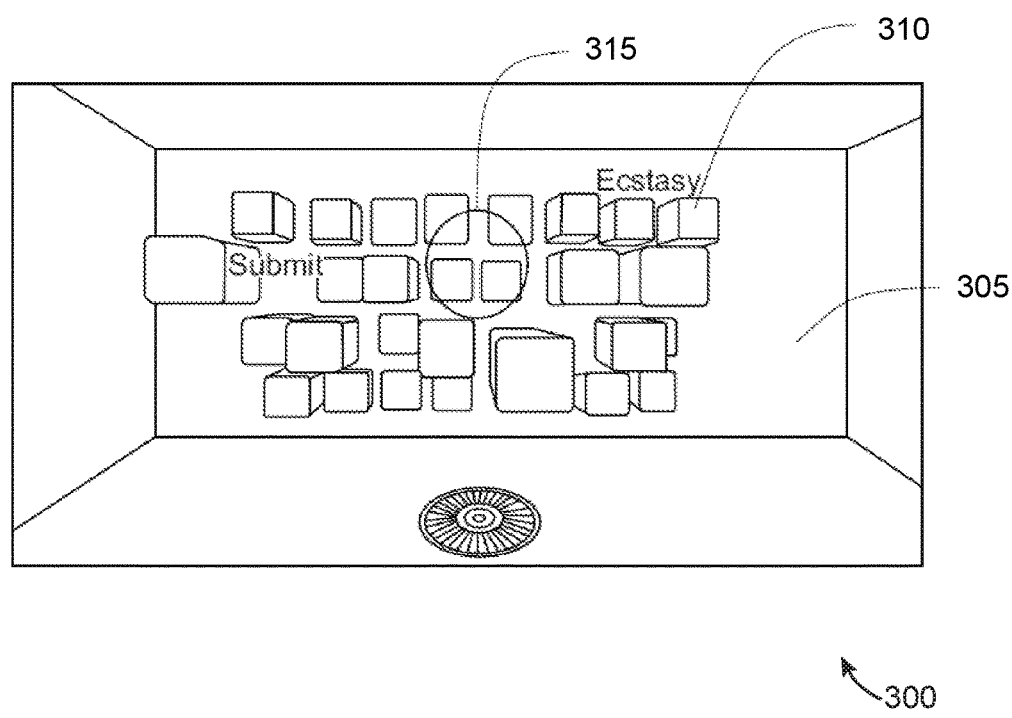
FIG. 3 is an illustration of an exemplary visual display of data as processed by a cube 100, in accordance with an embodiment of the present invention.

FIG. 3 is an illustration of an exemplary visual display of data as processed by a cube 100, in accordance with an embodiment of the present invention. In some embodiments, a cube 100 may be connected, by a wireless and/or wired connection, to a computational machine having a means of display and/or a means of connecting to a display device. In some alternative embodiments, cube 100 may have intrinsic means of display. In the present embodiment, a display 305 may provide illustration of individual data samples 310. In a non-limiting example, a data sample 310 may represent an emotion. In the present non-limiting example, a data sample 310 representing an emotion may raise and lower according to received EPG data from environment, user input, etc. In some embodiments, data samples 310 may represent data in any form, including, without limitation, colors, words, bars, etc. In the present embodiment, display 305 may have a ring 315 which may indicate intensity of various data samples 310. In some embodiments, ring 315 may be a plasma ring. In some embodiments, the plasma ring may comprise eight colors that varies in intensity and size based on the level of eight primal emotions felt by the artificial intelligence (AI) of cube 100. In a non-limiting example, individual emotions may be represented by textual words, and size of the textual words may indicate intensity of the emotions. In the present non-limiting example, data regarding emotions may be an EPG computed by a server 205 and transmitted to a computational machine. In some embodiments, aesthetic of ring 315 may change as a result of received data. In a non-limiting example, a received EPG may show a high level of a particular emotion, e.g. joy, which may change color of ring 315 to represent raised levels of that particular emotion. In some embodiments, received data may cause physical actions in the cube 100. In a non-limiting example, a received EPG showing a high level of a particular emotion, e.g. anger, may cause cube 100 to vibrate. In some embodiments, cube 100 and/or external computational machine may utilize other means, including, without limitation, audio, video, heat generation, etc., to represent received data. In a non-limiting example, a cube 100 may emit sounds in varying volumes and/or pitches depending on which particular emotions it may determine to represent.

In some embodiments, cube 100 and/or other hardware integrated with cube 100 may have a variety of means for receiving data, including, without limitation, input from user (text, image, video, audio file, etc.), motion sensing, pulse measurement, heat sensing, facial detection, etc. In a non-limiting example, cube 100 may have a gyroscope and accelerometer that may enable cube 100 to detect motion.

Some embodiments may provide a software development kit (SDK) for use with external computational machines to effectively run embodiment software. In some of these embodiments, SDK may provide a set of tools that may enable users of an external computational machine to represent processed data from an embodiment server 205 and/or cube 100. In a non-limiting example, tools may include, but not limited to, OPENCV, OPENEAR, CLEVERBOT, and DRAGON VOICE. In another non-limiting example, hardware manufacturers of devices such as, but not limited to, for home security, entertainment, and environment, health and fitness, etc., may provide SDKs to add functionalities to cube 100. In the present non-limiting example these device may communicate with cube 100 via various means such as, but not limited to, mobile phone or tablet, Bluetooth, directly via intranet or internet, etc. In another non-limiting example, a new SDK or functionalities may be added by a user in the form of apps downloaded from an online app store that would add new functionalities to cube 100 or the user application that may run on a tablet or smartphone.

In a non-limiting example, an SDK may enable a computational machine to detect and receive internal emotional reactions, user's emotional state, and/or surrounding environmental conditions and to communicate bi-directionally with a server 205. In the present non-limiting example, computational machine may receive emotional signals in a form of an EPG and SDK may process EPG prior to transmitting EPG data to server 205.

In some embodiments, embodiment software may be in a form of machine-executable applications which may be downloaded onto various computational machines. In some of these embodiments, downloaded applications may use a computational machine's components for installation and/or processing of information received from surrounding environments and/or other sources. In many embodiments, after installation of software applications onto a machine, the machine may receive signals from surrounding environment, process received signals, and/or transmit signals to a server 205 or other location. In some of these embodiments, after server 205 has performed processing of transmitted signals, server 205 may then transmit signals back to the machine. In one or more of these embodiments, the machine may display received data in a variety of ways, including, without limitation, movement of parts, voice pitch, color, words, etc.

Figure 4:
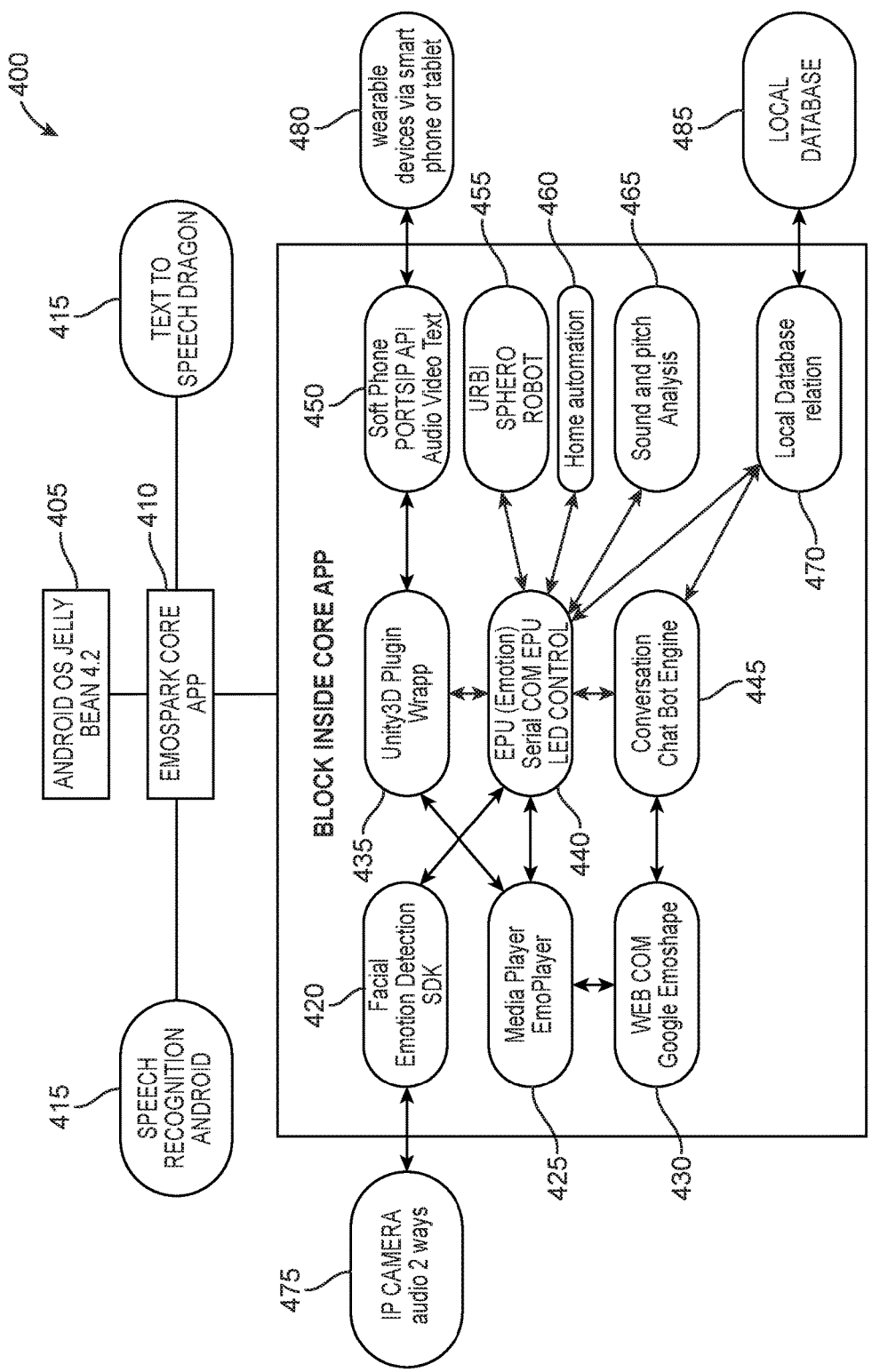
FIG. 4 is an illustration of an exemplary internal system of a cube 100 and/or associated devices, in accordance with an embodiment of the present invention.

FIG. 4 is an illustration of an exemplary internal system of a cube 100 and/or associated devices, in accordance with an embodiment of the present invention. In the present embodiment, cube 100 may have any suitable operating system 405. In a non-limiting example, cube 100 may have an Android Jelly Bean operating system 405 that has a native library that may access information from various services. In other embodiments, cube 100 may incorporate other operating systems. In the present embodiment, embodiment software may be stored in a core application 410 which may be suitable for receiving user input. In some of these embodiments, core application 410 may receive user input through a variety of input-detection software 415 and/or hardware, including, without limitation, speech recognition software and/or text to speech dragon. In some embodiments, core application 410 may have any suitable operating system, including, without limitation, Unity+XBMC+ PORTSIP. In the present embodiment, core application 410 may have a variety of internal systems, including, without limitation: facial detection SDK 420; media player 425; component object model (COM) 430; unity 3D plugin 435; EPU 440; chat engine 445; audio/video/text functionality 450; robot interfacing functionality 455; home automation 460; audio analysis 465; and means for connecting local databases 470. These systems may add functionalities and sensors to cube 100. These systems may communicate between each other directly, via cube 100 or via a server. As a non-limiting example, robot interfacing functionality 455 may use a URBI SDK to enable communication between cube 100 and a robot. In some embodiments, internal systems may communicate bi-directionally with each other as needed and/or as shown in FIG. 4. In the present embodiment, core application 410 may communicate bi-directionally with various external systems, including, without limitation, IP cameras 475, communication and/or wearable physical measurement devices 480, and local databases 485.

In some embodiments, cube 100 may have one or more motherboards. In a non-limiting example, a cube 100 may have a motherboard with all operating system functionalities (Wi-Fi etc.). In the present non-limiting example, cube 100 may also have a motherboard that may support any LED systems and/or an EPU. In some embodiments, cube 100 may not communicate with other systems other than a video input and audio input/output. In other embodiments, cube 100 may communicate with external systems for personalized access to services such as, but not limited to, the web.

Figure 5:
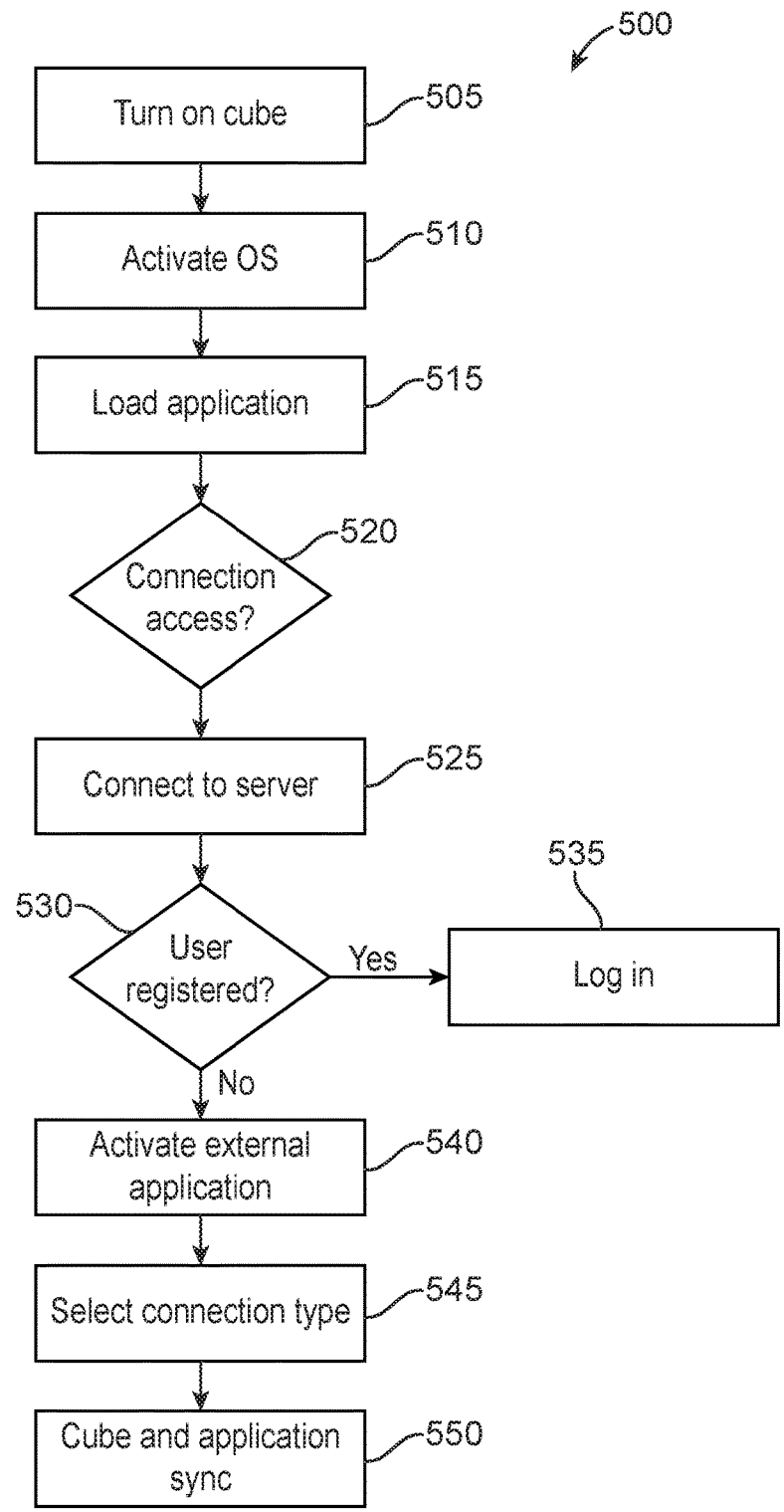
FIG. 5 is an illustration of an exemplary method for registering cube 100, in accordance with an embodiment of the present invention.

FIG. 5 is an illustration of an exemplary method for registering cube 100, in accordance with an embodiment of the present invention. In the present embodiment, a user may turn on a cube 100 in a step 505. In some embodiments, user may turn on cube 100 by means of a power switch on cube 100 surface. In other embodiments, user may turn on cube 100 by remote means. In some embodiments, cube 100 may perform various animations at start-up. In the present embodiment, cube 100 operating system may activate in a step 510. In some embodiments, operating system may utilize multiple types of connecting technology, including, without limitation, Wi-Fi and Bluetooth. In the present embodiment, cube 100 operating system may directly load core application 410 in a step 515. Further, in the present embodiment, core application 410 may determine whether user may have access to any connecting technologies in a step 520. Still further, in the present embodiment, if user has access to at least one connecting technology, cube 100 may connect to server 205 in a step 525. In the present embodiment, server 205 may determine whether user is registered in a step 530. In some embodiments, each cube 100 may have a unique ID. In a non-limiting example, an EPU microcontroller in a cube 100 may have a unique ID to identify EPU's corresponding cube 100. In some embodiments, a user ID may be paired with a cube 100 ID. In many embodiments, server 205 may synchronize with external internet platforms. In a non-limiting example, a server 205 may utilize a user's Facebook login information as user's login information for accessing cube 100. In the present embodiment, if user is registered, user may login in a step 535. Further, in the present embodiment, user may activate machine-readable application on a computational machine in a step 540. In some embodiments, users may use any suitable computational machine, including, without limitation, smartphone, tablet, laptop, etc. In many embodiments, cube 100 may record various data to use in identifying and/or communicating with user. In a non-limiting example, cube 100 may record user's facial pattern and voice to be able to use these to identify user later. In some embodiments, server 205 may connect to various networks to uncover data about user. In a non-limiting example, server 205 may use localization data to determine location of cube 100. In the present embodiment, application may prompt user to select a connection type in a step 545. In some embodiments, users may select individual or multiple connection types. In the present embodiment, cube 100 and application may synchronize in a step 550. Further, in the present embodiment, server 205 may prompt user for login information. In some embodiments, login information may be related to an external internet platform, including, without limitation, Facebook, Twitter, etc. In some of these embodiments, server 205 may use user's login information to synchronize with external internet platforms. In a non-limiting example, server 205 may determine user's Facebook friend list, upload photos, etc. In some embodiments, each cube 100 may be paired with a unique identifier so that each cube 100 may have only one owner. In a non-limiting example, when a user buys a cube 100, user may receive a number which he may input to cube 100.

In some embodiments, application 410 may have a core component for communications, including, without limitation, SOFTPHONE. In some embodiments, core application 410 may have SOFTPHONE and/or other similar library to allow it to be connected in audio/video data. In many embodiments, application 410 may have one or more plugins, including, without limitation, Unity and XBMC. As a non-limiting example, plugins like XBMC may manage all media for the user and act like a media player that cube 100 may control to show media to the user. SOFTPHONE may allow the user from his tablet to do a video call to cube 100. Unity 3D may allow cube 100 to represent the eye of the AI to visually see in real-time what the default personality of the AI learned from the expert system, what emotion the AI detects from the user in real time, and what the AI feels based on the interaction between the personality learned and what it detects as emotional inputs from the interaction with the world or it's memory of past events. In some of these embodiments, cube 100 may determine Unity plugin of display 305 via a data link. In a non-limiting example, a small cube 100 position, bar graph levels, and colors may be set via data link. In another non-limiting example, a left side of a screen may show a video feed of a user for user's camera and a right side of a screen may display a texture of what cube 100 may decide to show. In some embodiments, users may adjust positioning of components on a display screen of a computational machine. In some of these embodiments, application 410 may utilize XBMC code plugin structure. In a non-limiting example, if a user wants to use a full-screen mode, software may switch to XBMC or other suitable media player. In some embodiments, application 410 may always be running various components, including, without limitation, XBMC and Unity. In some of these embodiments, software may XBMC video on top of Unity and show or hide XBMC to be able to switch from one to another. In some alternative embodiments, each cube includes a unique EPG and a unique emotional sensibility. In which case, all cubes may have access to a specially-designed grid via severs, where they may meet and interact. Their unique EPG will act like a "magnet", attracting other cubes with a compatible EPGs. Such that, Cubes with similar affinities will connect and share similar media and information together In many embodiments, system may allow for automatic pairing between cube 100 and a user device using various connecting technology, including, without limitation, Bluetooth. In some of these embodiments, system may also perform demo applications to make auto-pairing between two devices which may first pair to specific device without confirmation and/or push Wi-Fi detail to a connected device.

Figure 6:
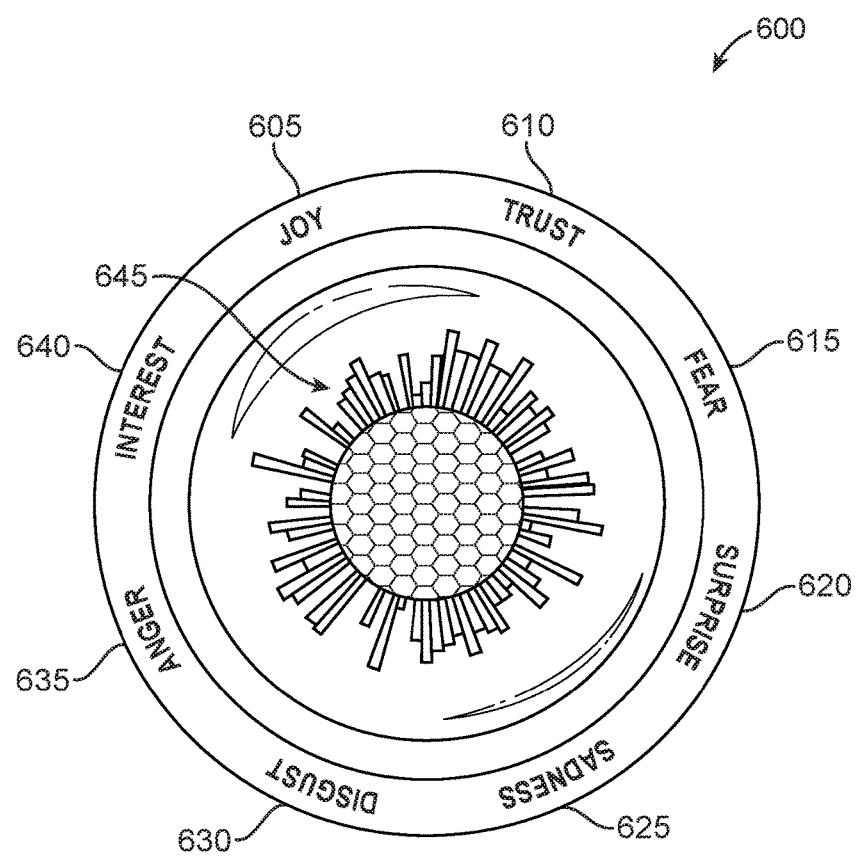
FIG. 6 is an illustration of an exemplary display of visual emotional detection, in accordance with an embodiment of the present invention.

FIG. 6 is an illustration of an exemplary display of visual emotional detection, in accordance with an embodiment of the present invention. In the present embodiment, visual emotional detector may have be suitable for representing a variety of emotions, including, without limitation, joy 605, trust 610, fear 615, surprise 620, sadness 625, disgust 630, anger 635, and interest 640. In some embodiments, various components of detector may be affected depending on user input. In a non-limiting example, if a user says "I hate you" to cube 100, visual emotional detection may show a response to statement by adjusting size of bars 645 in bar graph and color of cube 100. In some embodiments, responses from software may be different depending on adjustments made in response to user actions. In one embodiment, system may utilize various third-party sources to further add to emotional intelligence of software. In a non-limiting example, the system may use OpenEAR to add emotion detection in a voice using pitch, and/or harmonic analysis to estimate/infer emotional status/states. In another non-limiting example, system may use YouTube downloader to stream video into XBMC. In some embodiments, cube 100 may emit, through ripples, a variety of colors. In a non-limiting example, a cube 100 may emit 32 million colors, which may all be synchronized with color of an iris.

In some embodiments, software may utilize a conversational engine to allow software to converse with users. In some of these embodiments, software may draw data from history of user actions, statements, and/or physical readings as well as from internet sources such as Google and Wikipedia. In a non-limiting example, in response to a user statement, software may search user's previous conversations to determine an appropriate response.

Some embodiments may utilize emotional pathways. In a non-limiting example, each set of data may be saved with a unique vEPG time stamp. In the present non-limiting example, software may develop connections between sets of data and/or time stamps to create emotional pathways between data.

One embodiment may be suitable for use in recording audio stories. In some of these embodiments, system may integrate an audio SDK which may analyze sound in real time. In a non-limiting example, parents may record a story that may be read to a child at night. In the present non-limiting example, cube 100 may replay story to child and may gradually lower volume until child falls asleep. Further, in the present non-limiting example, if child wakes up during a night, cube 100 may detect child's fear and search for a suitable story which may be used to calm child.

In some embodiments, cube 100 may use a synchronization with an external internet platform to allow user to record information from such platforms. In a non-limiting example, a cube 100 may record events from a user's Facebook timeline. In another non-limiting example, cube 100 may access an external joke database to be able to use subject-specific jokes during conversations about a particular subject. In still another non-limiting example, cube 100 may create an XBMC plugin based on a YouTube video to allow user to watch video from Vevo and play without ads. In yet another non-limiting example, cube 100 may connect to a home automation device with an open API from Nest or NinjaSphere to allow cube 100 to control user's house. In another non-limiting example, cube 100 may connect to a wearable physical measurement device to monitor a user's blood pressure, oxygen level, etc. In the present non-limiting example, such measurements may be used in determining user's emotions as well as is offering recommendations to promote user's health. In some embodiments, cube 100 may control, without limitation, virtual avatars, video games, and physical electronic objects.

Figure 7:
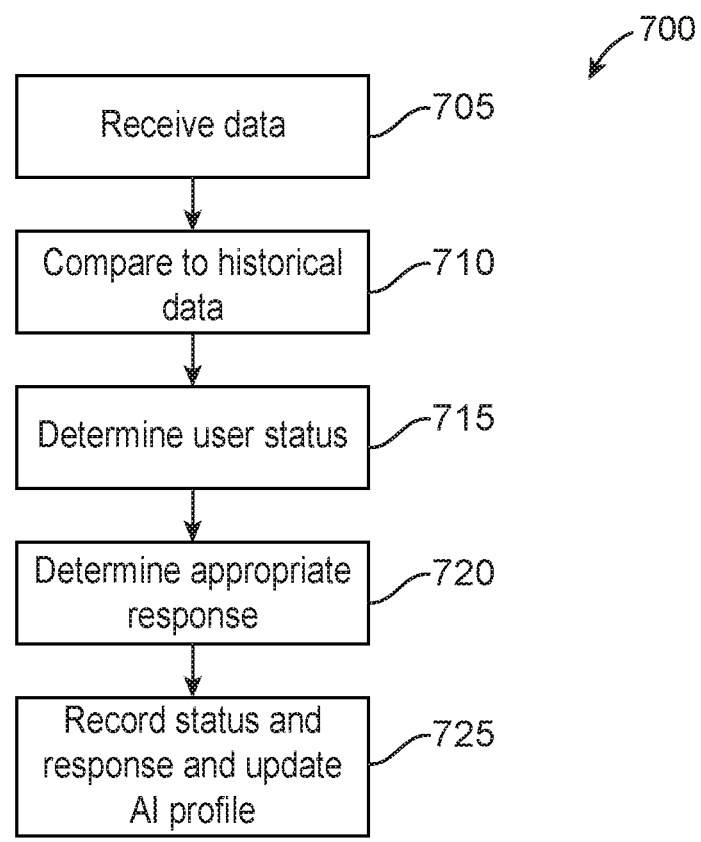
FIG. 7 is an illustration of an exemplary method for performing artificial intelligence, in accordance with an embodiment of the present invention.

FIG. 7 is an illustration of an exemplary method for performing artificial intelligence, in accordance with an embodiment of the present invention. In the present embodiment, a cube 100 may receive data relevant to discerning information about a user in a step 705. In some embodiments, cube 100 may be suitable for receiving data regarding a user's emotions. In some embodiments, data may come from a variety of sources, including, without limitation, user input, physical measurement devices (e.g. heart rate monitor), environmental information (e.g. time of day, date, weather), etc. In a non-limiting example, a user may type a message which may indicate that user is angry. In another non-limiting example, a heart rate monitor may indicate that a user has an unusually high heart rate which may indicate that user is angry. In the present embodiment, cube 100 may compare received data to stored data in a step 710. Further, in the present embodiment, cube 100 may use received data and/or comparison information to determine user's indication of a variety of emotions in a step 715. In a non-limiting example, cube 100 may compare heart rate monitor data to user's historical heart rate monitor data, and if user's heart rate is similar to previous instances when user was angry, cube 100 may use such information in determining if user may be angry. In another non-limiting example, if is user's birthday and user's historical data shows that user has often felt sadness on user's birthday, cube 100 may use such information in determining if user may be sad. In the present embodiment, cube 100 may determine an appropriate response based on findings in a step 720. In a non-limiting example, if cube 100 determines that user may be sad, cube 100 may issue a message to user which may cheer user up. In the present non-limiting example, cube 100 may search historic data to locate previous instances when a message may indicated that user was cheered by message, and cube 100 may provide a same or similar message. The status of the user and the response provided may be recorded in a step 725 along with updating of the AI emotional profile in the learning process.

Those skilled in the art will readily recognize, in light of and in accordance with the teachings of the present invention, that any of the foregoing steps and/or system modules may be suitably replaced, reordered, removed and additional steps and/or system modules may be inserted depending upon the needs of the particular application, and that the systems of the foregoing embodiments may be implemented using any of a wide variety of suitable processes and system modules, and is not limited to any particular computer hardware, software, middleware, firmware, microcode and the like. For any method steps described in the present application that can be carried out on a computing machine, a typical computer system can, when appropriately configured or designed, serve as a computer system in which those aspects of the invention may be embodied.

Figure 8:
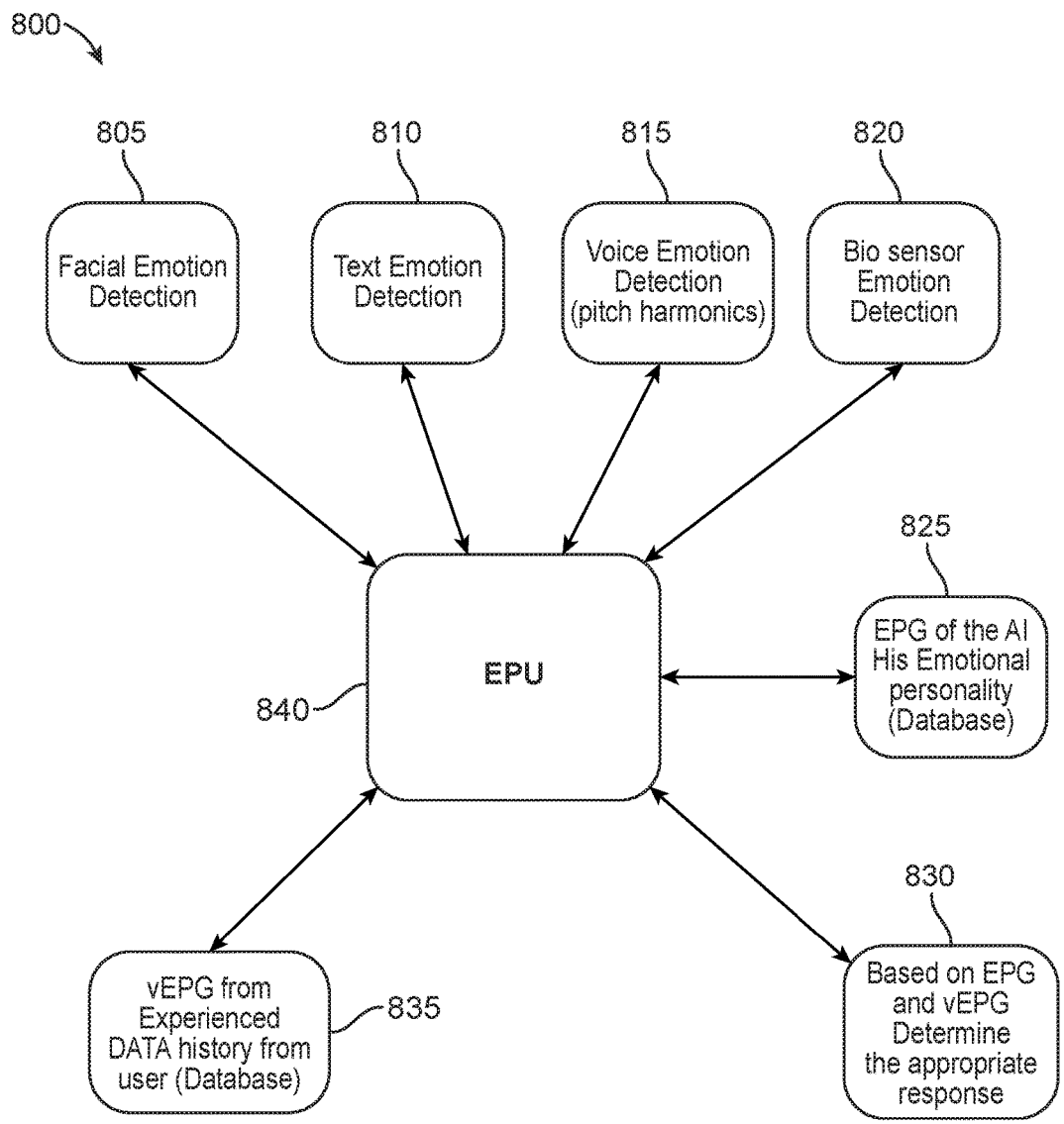
FIG. 8 is an illustration of an exemplary emotion processing unit and associated internal systems, in accordance with an embodiment of the present invention.

FIG. 8 is an illustration of an exemplary emotion processing unit and associated internal systems, in accordance with an embodiment of the present invention. In the present embodiment, emotion processing unit (EPU) 840 may communicate bi-directionally with internal systems, including, without limitation: facial emotion detection 805; text emotion detection 810; voice emotion detection 815; and bio sensor emotion detector 820. The internal systems receive inputs from various sensors that are observing a user's reactions and inputs to cube 100. Detected emotions from the internal systems may be transferred to EPU 840. EPU 840 may receive access and receive vEPG from experienced data history from user database 835 and EPG of the AI emotional database 825. In some embodiments, these databases are maintained within cube 100. In some embodiments these databases accessed from an external server. EPU 840 may use detected emotions from one or more of the internal systems along with data from the databases to calculate an appropriate response in substantially real-time. The calculated response may be communicated to other systems within cube 100 and/or external systems. In many embodiments, EPU 840 may algorithms and/or models to process the detected emotions using at least two of the primary human emotions. As a non-limiting example, the primary human emotions may include, but not limited to, faith, trust, confident, tense, fear, terrify, distract, surprise, amaze, pensive, sad, depress, bored, disgust, hate, annoyed, anger, rage, excite, great high, harmony, happy, ecstasy, love, submit, awe, refuse, regret, contempt, aggressive, optimist, etc. In some embodiments, EPU 840 may calculate the user emotion level (EPG). In some embodiments, EPU 840 may calculate the AI emotion level (EPG). In some embodiments, EPU 840 may calculate the user and AI emotion level (EPG). In some embodiments, the databases are updated/modified with the calculated responses and/or emotion levels. In many embodiments, the AI does not simply respond based on the user emotional profile but on its own profile that the AI will create based on all its experience (emotional machine learning). The AI will develop its own sensibility and all emotional inputs will in real-time affect and modify its emotional status and EPG.

Figure 9:
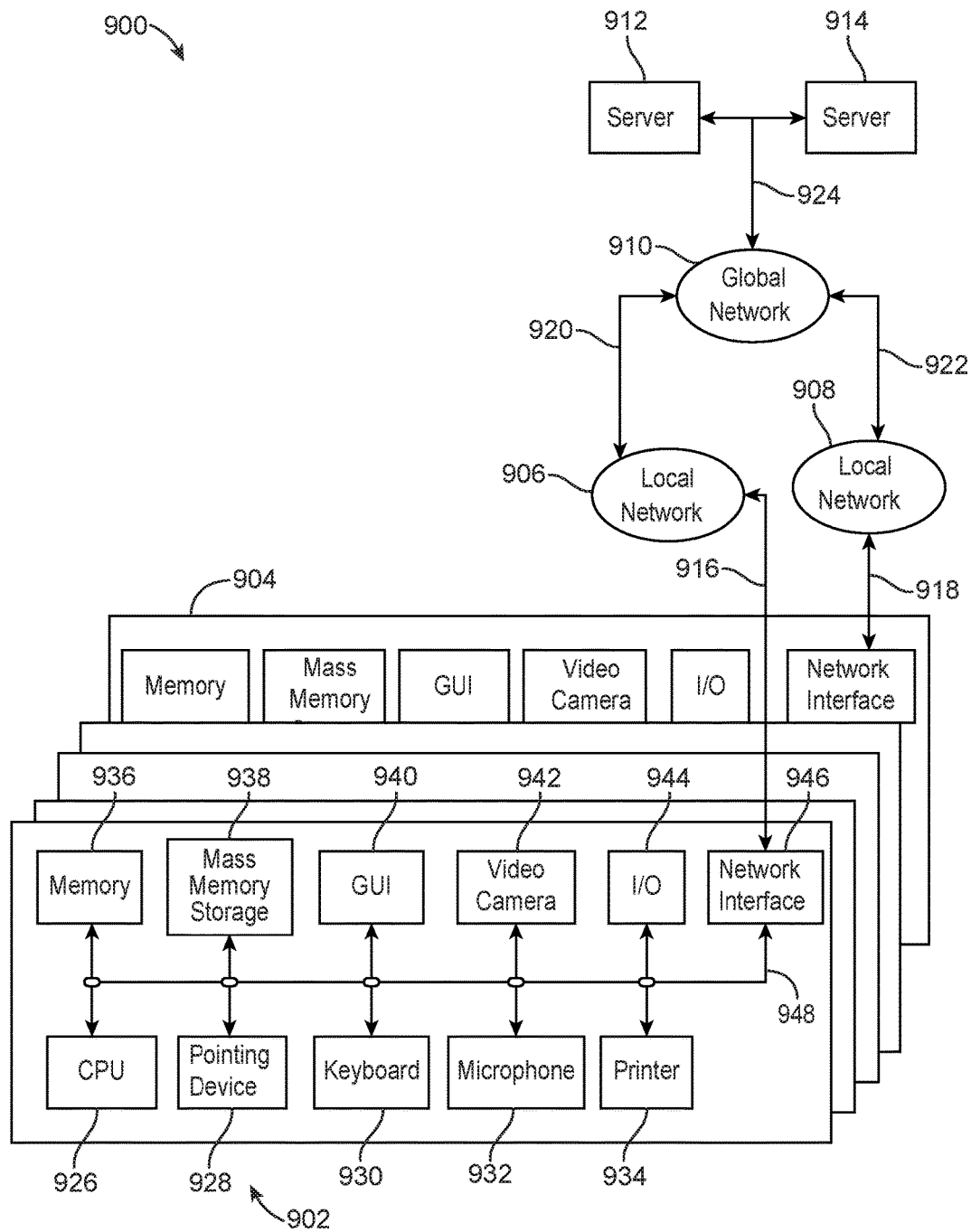
FIG. 9 is a block diagram depicting an exemplary client/server system which may be used by an exemplary web-enabled/networked embodiment of the present invention.

FIG. 9 is a block diagram depicting an exemplary client/server system which may be used by an exemplary web-enabled/networked embodiment of the present invention.

A communication system 900 includes a multiplicity of clients with a sampling of clients denoted as a client 902 and a client 904, a multiplicity of local networks with a sampling of networks denoted as a local network 906 and a local network 908, a global network 910 and a multiplicity of servers with a sampling of servers denoted as a server 912 and a server 914.

Client 902 may communicate bi-directionally with local network 906 via a communication channel 916. Client 904 may communicate bi-directionally with local network 908 via a communication channel 918. Local network 906 may communicate bi-directionally with global network 910 via a communication channel 920. Local network 908 may communicate bi-directionally with global network 910 via a communication channel 922. Global network 910 may communicate bi-directionally with server 912 and server 914 via a communication channel 924. Server 912 and server 914 may communicate bi-directionally with each other via communication channel 924. Furthermore, clients 902, 904, local networks 906, 908, global network 910 and servers 912, 914 may each communicate bi-directionally with each other.

In one embodiment, global network 910 may operate as the Internet. It will be understood by those skilled in the art that communication system 900 may take many different forms. Non-limiting examples of forms for communication system 900 include local area networks (LANs), wide area networks (WANs), wired telephone networks, wireless networks, or any other network supporting data communication between respective entities.

Clients 902 and 904 may take many different forms. Non-limiting examples of clients 902 and 904 include personal computers, personal digital assistants (PDAs), cellular phones and smartphones.

Client 902 includes a CPU 926, a pointing device 928, a keyboard 930, a microphone 932, a printer 934, a memory 936, a mass memory storage 938, a GUI 940, a video camera 942, an input/output interface 944, and a network interface 946.

CPU 926, pointing device 928, keyboard 930, microphone 932, printer 934, memory 936, mass memory storage 938, GUI 940, video camera 942, input/output interface 944 and network interface 946 may communicate in a unidirectional manner or a bi-directional manner with each other via a communication channel 948. Communication channel 948 may be configured as a single communication channel or a multiplicity of communication channels.

CPU 926 may be comprised of a single processor or multiple processors. CPU 926 may be of various types including micro-controllers (e.g., with embedded RAM/ROM) and microprocessors such as programmable devices (e.g., RISC or SISC based, or CPLDs and FPGAs) and devices not capable of being programmed such as gate array ASICs (Application Specific Integrated Circuits) or general purpose microprocessors.

As is well known in the art, memory 936 is used typically to transfer data and instructions to CPU 926 in a bi-directional manner. Memory 936, as discussed previously, may include any suitable computer-readable media, intended for data storage, such as those described above excluding any wired or wireless transmissions unless specifically noted. Mass memory storage 938 may also be coupled bi-directionally to CPU 926 and provides additional data storage capacity and may include any of the computer-readable media described above. Mass memory storage 938 may be used to store programs, data and the like and is typically a secondary storage medium such as a hard disk. It will be appreciated that the information retained within mass memory storage 938, may, in appropriate cases, be incorporated in standard fashion as part of memory 936 as virtual memory.

CPU 926 may be coupled to GUI 940. GUI 940 enables a user to view the operation of computer operating system and software. CPU 926 may be coupled to pointing device 928. Non-limiting examples of pointing device 928 include computer mouse, trackball and touchpad. Pointing device 928 enables a user with the capability to maneuver a computer cursor about the viewing area of GUI 940 and select areas or features in the viewing area of GUI 940. CPU 926 may be coupled to keyboard 930. Keyboard 930 enables a user with the capability to input alphanumeric textual information to CPU 926. CPU 926 may be coupled to microphone 932. Microphone 932 enables audio produced by a user to be recorded, processed and communicated by CPU 926. CPU 926 may be connected to printer 934. Printer 934 enables a user with the capability to print information to a sheet of paper. CPU 926 may be connected to video camera 942. Video camera 942 enables video produced or captured by user to be recorded, processed and communicated by CPU 926.

CPU 926 may also be coupled to input/output interface 944 that connects to one or more input/output devices such as such as CD-ROM, video monitors, track balls, mice, keyboards, microphones, touch-sensitive displays, transducer card readers, magnetic or paper tape readers, tablets, styluses, voice or handwriting recognizers, or other well-known input devices such as, of course, other computers.

Finally, CPU 926 optionally may be coupled to network interface 946 which enables communication with an external device such as a database or a computer or telecommunications or internet network using an external connection shown generally as communication channel 916, which may be implemented as a hardwired or wireless communications link using suitable conventional technologies. With such a connection, CPU 926 might receive information from the network, or might output information to a network in the course of performing the method steps described in the teachings of the present invention.

Figure 10:
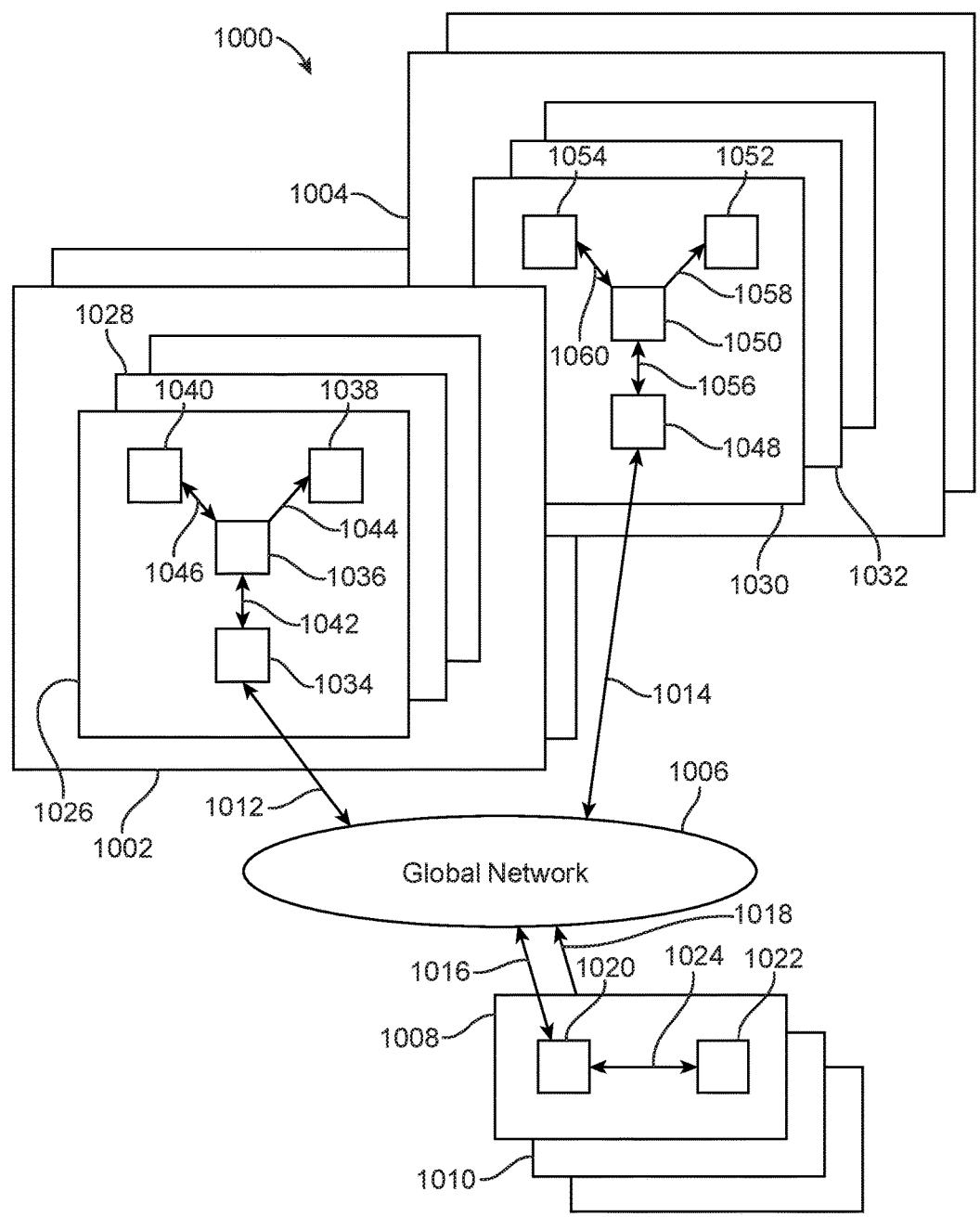
FIG. 10 illustrates a block diagram depicting a conventional client/server communication system.

FIG. 10 illustrates a block diagram depicting a conventional client/server communication system.

A communication system 1000 includes a multiplicity of networked regions with a sampling of regions denoted as a network region 1002 and a network region 1004, a global network 1006 and a multiplicity of servers with a sampling of servers denoted as a server device 1008 and a server device 1010.

Network region 1002 and network region 1004 may operate to represent a network contained within a geographical area or region. Non-limiting examples of representations for the geographical areas for the networked regions may include postal zip codes, telephone area codes, states, counties, cities and countries. Elements within network region 1002 and 1004 may operate to communicate with external elements within other networked regions or within elements contained within the same network region.

In some implementations, global network 1006 may operate as the Internet. It will be understood by those skilled in the art that communication system 1000 may take many different forms. Non-limiting examples of forms for communication system 1000 include local area networks (LANs), wide area networks (WANs), wired telephone networks, cellular telephone networks or any other network supporting data communication between respective entities via hardwired or wireless communication networks. Global network 1006 may operate to transfer information between the various networked elements.

Server device 1008 and server device 1010 may operate to execute software instructions, store information, support database operations and communicate with other networked elements. Non-limiting examples of software and scripting languages which may be executed on server device 1008 and server device 1010 include C, C++, C# and Java.

Network region 1002 may operate to communicate bi-directionally with global network 1006 via a communication channel 1012. Network region 1004 may operate to communicate bi-directionally with global network 1006 via a communication channel 1014. Server device 1008 may operate to communicate bi-directionally with global network 1006 via a communication channel 1016. Server device 1010 may operate to communicate bi-directionally with global network 1006 via a communication channel 1018. Network region 1002 and 1004, global network 1006 and server devices 1008 and 1010 may operate to communicate with each other and with every other networked device located within communication system 1000.

Server device 1008 includes a networking device 1020 and a server 1022. Networking device 1020 may operate to communicate bi-directionally with global network 1006 via communication channel 1016 and with server 1022 via a communication channel 1024. Server 1022 may operate to execute software instructions and store information.

Network region 1002 includes a multiplicity of clients with a sampling denoted as a client 1026 and a client 1028. Client 1026 includes a networking device 1034, a processor 1036, a GUI 1038 and an interface device 1040. Non-limiting examples of devices for GUI 1038 include monitors, televisions, cellular telephones, smartphones and PDAs (Personal Digital Assistants). Non-limiting examples of interface device 1040 include pointing device, mouse, trackball, scanner and printer. Networking device 1034 may communicate bi-directionally with global network 1006 via communication channel 1012 and with processor 1036 via a communication channel 1042. GUI 1038 may receive information from processor 1036 via a communication channel 1044 for presentation to a user for viewing. Interface device 1040 may operate to send control information to processor 1036 and to receive information from processor 1036 via a communication channel 1046. Network region 1004 includes a multiplicity of clients with a sampling denoted as a client 1030 and a client 1032. Client 1030 includes a networking device 1048, a processor 1050, a GUI 1052 and an interface device 1054. Non-limiting examples of devices for GUI 1038 include monitors, televisions, cellular telephones, smartphones and PDAs (Personal Digital Assistants). Non-limiting examples of interface device 1040 include pointing devices, mousse, trackballs, scanners and printers. Networking device 1048 may communicate bi-directionally with global network 1006 via communication channel 1014 and with processor 1050 via a communication channel 1056. GUI 1052 may receive information from processor 1050 via a communication channel 1058 for presentation to a user for viewing. Interface device 1054 may operate to send control information to processor 1050 and to receive information from processor 1050 via a communication channel 1060.

For example, consider the case where a user interfacing with client 1026 may want to execute a networked application. A user may enter the IP (Internet Protocol) address for the networked application using interface device 1040. The IP address information may be communicated to processor 1036 via communication channel 1046. Processor 1036 may then communicate the IP address information to networking device 1034 via communication channel 1042. Networking device 1034 may then communicate the IP address information to global network 1006 via communication channel 1012. Global network 1006 may then communicate the IP address information to networking device 1020 of server device 1008 via communication channel 1016. Networking device 1020 may then communicate the IP address information to server 1022 via communication channel 1024. Server 1022 may receive the IP address information and after processing the IP address information may communicate return information to networking device 1020 via communication channel 1024. Networking device 1020 may communicate the return information to global network 1006 via communication channel 1016. Global network 1006 may communicate the return information to networking device 1034 via communication channel 1012. Networking device 1034 may communicate the return information to processor 1036 via communication channel 1042. Processor 1046 may communicate the return information to GUI 1038 via communication channel 1044. User may then view the return information on GUI 1038.

It will be further apparent to those skilled in the art that at least a portion of the novel method steps and/or system components of the present invention may be practiced and/or located in location(s) possibly outside the jurisdiction of the United States of America (USA), whereby it will be accordingly readily recognized that at least a subset of the novel method steps and/or system components in the foregoing embodiments must be practiced within the jurisdiction of the USA for the benefit of an entity therein or to achieve an object of the present invention. Thus, some alternate embodiments of the present invention may be configured to comprise a smaller subset of the foregoing means for and/or steps described that the applications designer will selectively decide, depending upon the practical considerations of the particular implementation, to carry out and/or locate within the jurisdiction of the USA. For example, any of the foregoing described method steps and/or system components which may be performed remotely over a network (e.g., without limitation, a remotely located server) may be performed and/or located outside of the jurisdiction of the USA while the remaining method steps and/or system components (e.g., without limitation, a locally located client) of the forgoing embodiments are typically required to be located/performed in the USA for practical considerations. In client-server architectures, a remotely located server typically generates and transmits required information to a US based client, for use according to the teachings of the present invention. Depending upon the needs of the particular application, it will be readily apparent to those skilled in the art, in light of the teachings of the present invention, which aspects of the present invention can or should be located locally and which can or should be located remotely. Thus, for any claims construction of the following claim limitations that are construed under 35 USC § 112 (6) it is intended that the corresponding means for and/or steps for carrying out the claimed function are the ones that are locally implemented within the jurisdiction of the USA, while the remaining aspect(s) performed or located remotely outside the USA are not intended to be construed under 35 USC § 112 (6). In some embodiments, the methods and/or system components which may be located and/or performed remotely include, without limitation: synthetic emotion and machine learning, patterns identification, and algorithms.

It is noted that according to USA law, all claims must be set forth as a coherent, cooperating set of limitations that work in functional combination to achieve a useful result as a whole. Accordingly, for any claim having functional limitations interpreted under 35 USC § 112 (6) where the embodiment in question is implemented as a client-server system with a remote server located outside of the USA, each such recited function is intended to mean the function of combining, in a logical manner, the information of that claim limitation with at least one other limitation of the claim. For example, in client-server systems where certain information claimed under 35 USC § 112 (6) is/(are) dependent on one or more remote servers located outside the USA, it is intended that each such recited function under 35 USC § 112 (6) is to be interpreted as the function of the local system receiving the remotely generated information required by a locally implemented claim limitation, wherein the structures and or steps which enable, and breath life into the expression of such functions claimed under 35 USC § 112 (6) are the corresponding steps and/or means located within the jurisdiction of the USA that receive and deliver that information to the client (e.g., without limitation, client-side processing and transmission networks in the USA). When this application is prosecuted or patented under a jurisdiction other than the USA, then "USA" in the foregoing should be replaced with the pertinent country or countries or legal organization(s) having enforceable patent infringement jurisdiction over the present application, and "35 USC § 112 (6)" should be replaced with the closest corresponding statute in the patent laws of such pertinent country or countries or legal organization(s).

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

It is noted that according to USA law 35 USC § 112 (1), all claims must be supported by sufficient disclosure in the present patent specification, and any material known to those skilled in the art need not be explicitly disclosed. However, 35 USC § 112 (6) requires that structures corresponding to functional limitations interpreted under 35 USC § 112 (6) must be explicitly disclosed in the patent specification. Moreover, the USPTO's Examination policy of initially treating and searching prior art under the broadest interpretation of a "mean for" claim limitation implies that the broadest initial search on 112(6) functional limitation would have to be conducted to support a legally valid Examination on that USPTO policy for broadest interpretation of "mean for" claims. Accordingly, the USPTO will have discovered a multiplicity of prior art documents including disclosure of specific structures and elements which are suitable to act as corresponding structures to satisfy all functional limitations in the below claims that are interpreted under 35 USC § 112 (6) when such corresponding structures are not explicitly disclosed in the foregoing patent specification. Therefore, for any invention element(s)/structure(s) corresponding to functional claim limitation(s), in the below claims interpreted under 35 USC § 112 (6), which is/are not explicitly disclosed in the foregoing patent specification, yet do exist in the patent and/or non-patent documents found during the course of USPTO searching, Applicant(s) incorporate all such functionally corresponding structures and related enabling material herein by reference for the purpose of providing explicit structures that implement the functional means claimed. Applicant(s) request(s) that fact finders during any claims construction proceedings and/or examination of patent allowability properly identify and incorporate only the portions of each of these documents discovered during the broadest interpretation search of 35 USC § 112 (6) limitation, which exist in at least one of the patent and/or non-patent documents found during the course of normal USPTO searching and or supplied to the USPTO during prosecution. Applicant(s) also incorporate by reference the bibliographic citation information to identify all such documents comprising functionally corresponding structures and related enabling material as listed in any PTO Form-892 or likewise any information disclosure statements (IDS) entered into the present patent application by the USPTO or Applicant(s) or any $3^{rd}$ parties. Applicant(s) also reserve its right to later amend the present application to explicitly include citations to such documents and/or explicitly include the functionally corresponding structures which were incorporate by reference above.

Thus, for any invention element(s)/structure(s) corresponding to functional claim limitation(s), in the below claims, that are interpreted under 35 USC § 112 (6), which is/are not explicitly disclosed in the foregoing patent specification, Applicant(s) have explicitly prescribed which documents and material to include the otherwise missing disclosure, and have prescribed exactly which portions of such patent and/or non-patent documents should be incorporated by such reference for the purpose of satisfying the disclosure requirements of 35 USC § 112 (6). Applicant(s) note that all the identified documents above which are incorporated by reference to satisfy 35 USC § 112 (6) necessarily have a filing and/or publication date prior to that of the instant application, and thus are valid prior documents to incorporated by reference in the instant application.

Having fully described at least one embodiment of the present invention, other equivalent or alternative methods of implementing artificial intelligence according to the present invention will be apparent to those skilled in the art. Various aspects of the invention have been described above by way of illustration, and the specific embodiments disclosed are not intended to limit the invention to the particular forms disclosed. The particular implementation of the artificial intelligence may vary depending upon the particular context or application. By way of example, and not limitation, the artificial intelligence described in the foregoing were principally directed to emotion implementations; however, similar techniques may instead be applied to other useful implementations, such as, without limitation, intelligent search engines, intelligent scheduling and/or organizing systems, etc., which implementations of the present invention are contemplated as within the scope of the present invention. The invention is thus to cover all modifications, equivalents, and alternatives falling within the spirit and scope of the following claims. It is to be further understood that not all of the disclosed embodiments in the foregoing specification will necessarily satisfy or achieve each of the objects, advantages, or improvements described in the foregoing specification.

Claim elements and steps herein may have been numbered and/or lettered solely as an aid in readability and understanding. Any such numbering and lettering in itself is not intended to and should not be taken to indicate the ordering of elements and/or steps in the claims.

The corresponding structures, materials, acts, and equivalents of all means or step plus function elements in the claims below are intended to include any structure, material, or act for performing the function in combination with other claimed elements as specifically claimed.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A method for performing emotional machine learning comprising the steps of:
providing an emotion processing unit (EPU) and at least one sensor in communication with the emotion processing unit for sensing a condition external to the EPU, wherein said EPU comprises a special-purpose processor configured to adopt a particular emotional state by loading and executing emotional state information corresponding to the particular emotional state and stored in a database in electronic communication with the EPU, and wherein said EPU is capable of adopting other emotional states by loading and executing additional emotional state information stored in the database and corresponding to the other emotional states;
retrieving, by the emotion processing unit, at least one prior emotional state of the emotion processing unit stored in the database;
sensing the condition external to the emotion processing unit using the at least one sensor;
processing, by a machine learning algorithm executed by the emotion processing unit, the at least one prior emotional state of the emotion processing unit and the sensed condition to calculate an updated emotional state of the emotion processing unit;
storing the updated emotional state of the emotion processing unit in the database for future usage by the emotion processing unit;
calculating, by the emotion processing unit, a response based on the updated emotional state of the emotion processing unit; and
communicating the response.

2. The method of claim 1, wherein the updated emotional state is stored as an emotional profile graph (EPG) in the database.

3. The method of claim 1, wherein the step of sensing further comprises sensing at least one emotional state of a user.

4. The method of claim 3, wherein the step of processing further comprises processing, by the emotion processing unit, the at least one prior emotional state of the emotion processing unit and the at least one emotional state of the user to calculate the updated emotional state of the emotion processing unit.

5. The method of claim 4, further comprising storing the at least one emotional state of the user in the database for future use by the emotion processing unit as an emotional profile graph (EPG) in the database.

6. The method of claim 1, wherein the step of communicating the response comprises displaying the updated emotional state of the emotion processing unit using a visual display in communication with the emotion processing unit.

7. The method of claim 1, wherein the step of communicating the response comprises communicating the response to a computer system.

8. The method of claim 1, further comprising executing an action by the emotion processing unit based upon the response.

9. The method of claim 1, wherein the step of sensing further comprises receiving textual input from a user.

10. The method of claim 9, further comprising calculating the updated emotional state of the emotion processing unit using the textual input.

11. The method of claim 1, wherein the emotion processing unit is a hardware processor.

12. The method of claim 1, wherein the emotion processing unit is implemented in a remote computer system.

13. A system for performing emotional machine learning comprising:
an emotion processing unit (EPU) comprising a special-purpose processor configured to adopt a particular emotional state by loading and executing emotional state information corresponding to the particular emotional state and stored in a database in electronic communication with the EPU, and wherein said EPU is capable of adopting other emotional states by loading and executing additional emotional state information stored in the database and corresponding to the other emotional states; and
at least one sensor in communication with the emotion processing unit for sensing a condition external to the emotion processing unit, wherein, the emotion processing unit is programmed to perform the steps of:
retrieving at least one prior emotional state of the emotion processing unit stored in the database;
sensing the condition external to the emotion processing unit using the at least one sensor;
executing a machine learning algorithm to process the at least one prior emotional state of the emotion processing unit and the sensed condition to calculate an updated emotional state of the emotion processing unit;
storing the updated emotional state of the emotion processing unit in the database for future usage by the emotion processing unit;
calculating, by the emotion processing unit, a response based on the updated emotional state of the emotion processing unit; and
communicating the response.

14. The system of claim 13, wherein the updated emotional state of the emotion processing unit is stored as an emotional profile graph (EPG) in the database.

15. The system of claim 13, wherein the emotion processing unit is programmed to perform the step of sensing at least one emotional state of a user.

16. The system of claim 15, wherein the emotion processing unit is programmed to perform the step of processing the at least one prior emotional state of the emotion processing unit and the at least one emotional state of the user to calculate the updated emotional state of the emotion processing unit.

17. The system of claim 16, wherein the emotion processing unit is programmed to perform the step of storing the at least one emotional state of the user in the database for future use by the emotion processing unit as an emotional profile graph (EPG) in the database.

18. The system of claim 13, wherein the emotion processing unit is programmed to perform the step of displaying the updated emotional state of the emotion processing unit using a visual display in communication with the emotion processing unit.

19. The system of claim 13, wherein the emotion processing unit is programmed to perform the step of communicating the response to a computer system.

20. The system of claim 13, wherein the emotion processing unit is programmed to perform the step of executing an action based upon the response.

21. The system of claim 13, wherein the emotion processing unit is programmed to perform the step of receiving textual input from a user.

22. The system of claim 21, wherein the emotion processing unit is programmed to perform the step of calculating the updated emotional state of the emotion processing unit using the textual input.

23. The system of claim 13, wherein the emotion processing unit is a hardware processor.

24. The system of claim 13, wherein the emotion processing unit is implemented in a remote computer system.

* * * * *